United States Patent [19]

Cassonnet

[11] 4,040,030
[45] Aug. 2, 1977

[54] COMPUTER INSTRUCTION CONTROL APPARATUS AND METHOD

[75] Inventor: Jean-Claude Marcel Cassonnet, Conflans-Ste-Honorine, France

[73] Assignee: Compagnie Honeywell Bull (Societe Anonyme), Paris, France

[21] Appl. No.: 460,467

[22] Filed: Apr. 12, 1974

[30] Foreign Application Priority Data

Apr. 13, 1973 France .................... 73.13502

[51] Int. Cl.² .................................. G06F 9/00
[52] U.S. Cl. .................................... 364/200
[58] Field of Search ........................ 340/172.5

[56] References Cited
U.S. PATENT DOCUMENTS

| | | | |
|---|---|---|---|
| 3,553,655 | 1/1971 | Anderson et al. | 340/172.5 |
| 3,559,183 | 1/1971 | Sussenguth | 340/172.5 |
| 3,577,190 | 5/1971 | Cocke et al. | 340/172.5 |
| 3,644,900 | 2/1972 | Mizoguchi | 340/172.5 |
| 3,736,567 | 5/1973 | Lotan et al. | 340/172.5 |
| 3,766,527 | 10/1973 | Briley | 340/172.5 |

Primary Examiner—Gareth D. Shaw
Assistant Examiner—C. T. Bartz
Attorney, Agent, or Firm—Lowe, King, Price & Markva

[57] ABSTRACT

The disclosure describes a data processing system including a program memory for storing a first instruction at a first address and a second instruction at a second address. The system includes a look-ahead feature in which the second instruction is stored in a buffer register while the first instruction is being stored in an execution register and is simultaneously being executed. A gate circuit controls the transmission of data between the buffer register and the execution register. If a third instruction having a third address is read into the program memory while the first instruction is being executed, the second and third addresses are compared. If the second and third addresses are identical, the gate circuit is inhibited and the second instruction is prevented from being transmitted to the execution register. Instead, the third instruction, or a portion thereof, is transmitted to the buffer and execution registers, so that the third instruction is executed in place of the second instruction.

8 Claims, 2 Drawing Figures

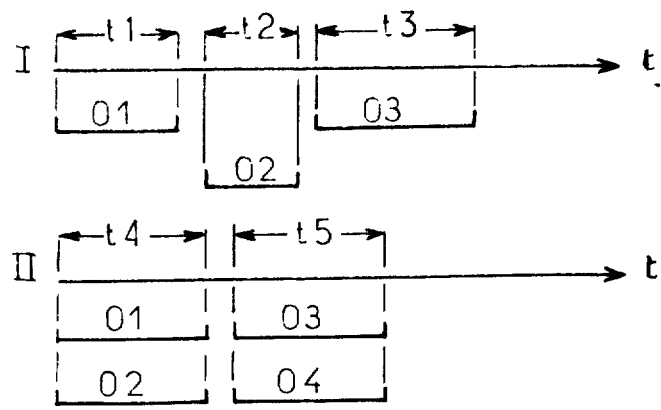
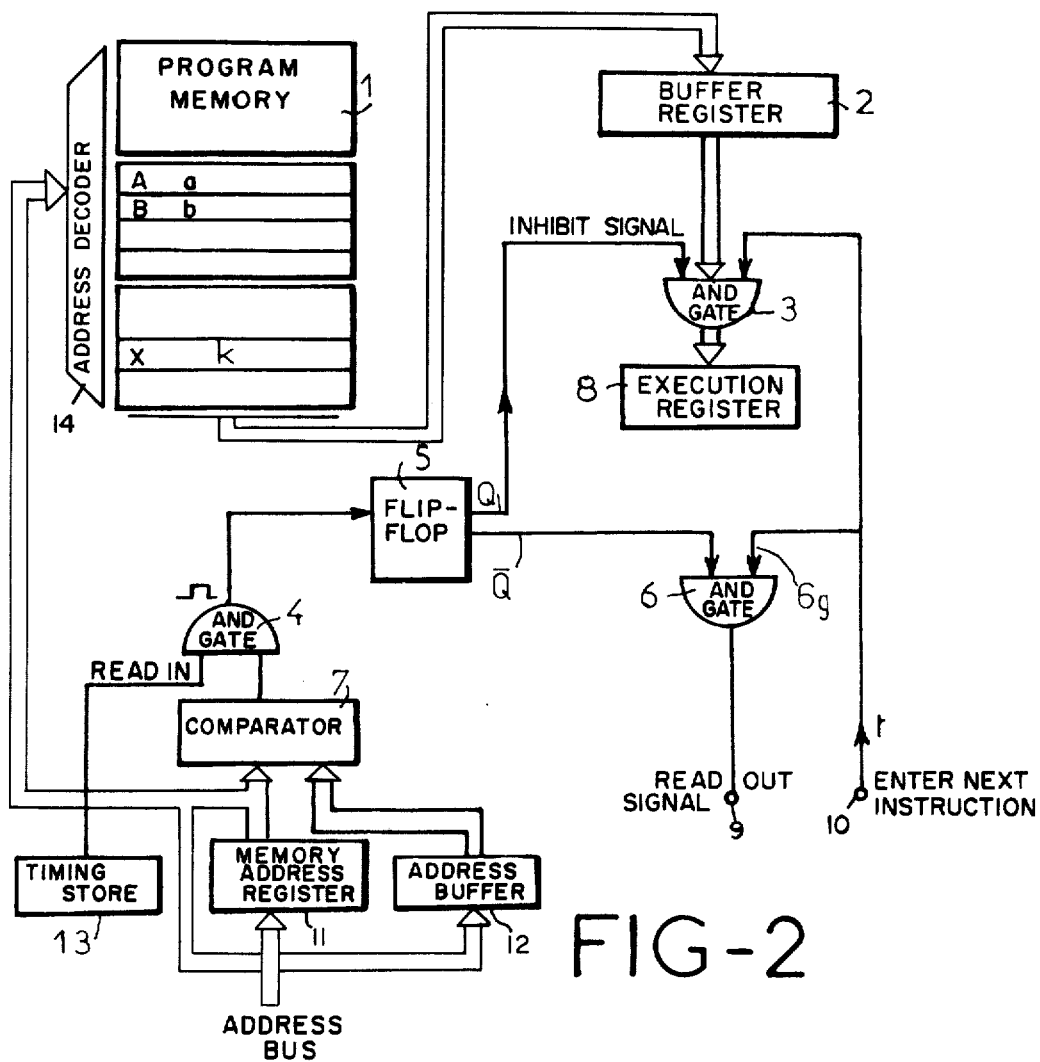
FIG-1
FIG-2

COMPUTER INSTRUCTION CONTROL APPARATUS AND METHOD

RELATED APPLICATION

The applicant claims priority under 35 U.S.C. 119 based on French Patent Application No. 73-13502, entitled "Dispositif de Prise en Compte des et al," filed Apr. 14, 1973.

BACKGROUND AND SUMMARY OF THE INVENTION

The present invention relates to data processing and more particularly relates to a method and apparatus for controlling the transmission of data between registers in a look-ahead program execution system.

In a data-processing system, the instructions constituting a program are recorded in one or more stores or memories and are carried out sequentially by the system. While the program is being carried out, alterations can be made, either deliberately or inadvertently, to the content of certain instructions contained in the program.

In most data processing systems, instructions follow each other in sequential order. For example, an instruction $a$ stored at an aaddress A might be programmed for execution immediately prior to an instruction $b$ stored at an address B. Instruction $a$ is normally read into an execution register while it is being executed or carried out. In order to save time during processing, some systems have a look-ahead feature in which instruction $b$ is stored in a special buffer memory or register while instruction $a$ is being executed. Once instruction $a$ has been carried out, instruction $b$ is at once available for execution or appropriate processing.

In practice, the buffer register is of limited capacity and it is not a complete instruction which is stored (since the instructions vary in length) but a certain number of data bits.

In the prior art, when instruction $b$ at address B is altered for any reason, and is replaced by an instruction $b'$ while instruction $a$ is being carried out, the buffer register will transmit instruction $b$ to the execution register, rather than instruction $b'$. Of course, this procedure will give the wrong result.

It is an object of the present invention to prevent instruction $b$ stored in the buffer register from being carried out if a modification is made in instruction $b$ while instruction $a$ is being carried out.

One feature of the present invention provides a method for taking into account dynamic alterations made to a program in a data-processing system provided with a look-ahead buffer store or register, wherein the progress of the program is arrested and returned to a chosen point when a new instruction replaces the instruction stored in the buffer register.

According to another feature, the program is arrested when the address of the new instruction read into the program memory and the address of the instruction contained in the buffer store are the same. A comparison operation prevents the instruction stored in the buffer register from being transferred to the execution register which would carry it out.

Another feature of the present invention provides an apparatus which employs the above method and which contains a buffer register into which is read the instruction following the instruction being carried out and stored in an execution register. A logic gate connected between the buffer register and the execution register is responsive to an inhibit signal generated by a logic means to prevent the transmission of data between the buffer and execution registers. The logic means produces the inhibit signal in response to a read-in signal which indicates that the new instruction is being read into the program memory and an output signal from a comparator which compares the address of the new instruction with the address of the instruction contained in the buffer register.

In accordance with another feature of the invention, the combined generation of the inhibit signal and a signal to indicate that the instruction stored in the execution register has been carried out causes the new instruction to be read out of the program memory into the buffer register. Hence, if an instruction is being read into a memory address B during the same cycle that the instruction at address B has been read out from memory to the buffer register, the instruction in the buffer register is not read out to the execution register; after the new instruction has been loaded into address B and transmitted to the buffer register, the new instruction is coupled from the buffer register to the execution register.

The way in which the program is carried out is thus unaffected by the fact that the instructions of which it is made up are read out in advance, since transfer of the contents of the buffer register is inhibited if an instruction is modified. Furthermore, as was mentioned above, the buffer register may record a certain number of instruction buts which may form a partial instruction or a number of instructions. The method according to the invention may be applied automatically in all cases, whereas practically nothing can be done to improve the situation from the software point of view, bearing in mind that the instructions are of different lengths whereas the buffer register can only contain a constant number of bits.

DESCRIPTION OF THE DRAWING

These and other objects, advantages and features of the invention will now be further described, by way of example, with reference to the accompanying drawing, in which:

FIG. 1 is a diagram showing the principle of the operation known as look-ahead programming, or reading in advance, and FIG. 2 is a diagram of an embodiment of apparatus according to the invention.

DESCRIPTION OF THE PREFERRED EMBODIMENT

In FIG. 1, reference numeral I refers to the normal progress of a stored program, with the variable being time $t$. The evolution of the program is as follows:

01 is an instruction $a$ being carried out during time period $t1$.

02 is an instruction $b$ being read out during time period $t2$.

03 is an instruction $b$ being carried out during time period $t3$.

At II is shown the way in which the operations take place in the case of a look-ahead program, with time still being the variable. 01 is instruction $a$ being carried out, and 02 is instruction $b$ being read out during the same time period $t4$.

Instruction b is carried out at 03 while instruction c is read out at 04, both during time period t5. The object of this process is to save time.

In FIG. 2 is shown an apparatus which enables the program to be read out in advance while preventing errors which may arise when an instruction in the program being processed is altered dynamically.

In store or program memory 1 are recorded a certain number of programs, and in particular an instruction a at address A and an instruction b at address B. When instruction a is being carried out and stored in an execution register 8 during time period t4, instruction b is being fed into a store or buffer register 2 and the address B of instruction b is being fed into a register 12.

When a fresh instruction k is fed from any suitable source, e.g., an instruction register, to any address X, in a manner known to those skilled in the art, while the instructions contained in memory 1 are being carried out, the address X is simultaneously fed to a memory address register 11. A flip-flop (not shown) which controls a timing store 13 is instructed to ask for instruction k to be read into memory 1. When instruction k is read into memory 1, store 13 is set to an ECR condition and produces a read-in signal that is transmitted to an AND gate 4.

The data, i.e., instructions, to be read into the addresses of memory 1 (which are stored in register 11) are, of course, fed to a data-input register (not shown). Likewise, the address of the data located in the data-input register can be determined through the use of a memory address register connected to memory 1. Decoder 14 is responsive to signals that indicate the memory addresses into which and from which instructions are to be read; said input registers and the manner in which they function in connection with a program memory are well known to those skilled in the art.

If, during time period t4, after instruction b has been read into register 2, the address of the new instruction b' read into memory 1 and the address B of instruction b to be read from the memory are the same, that is to say if instruction b at address B has been altered to instruction b' while instruction a is being carried out, a comparator circuit 7 produces a pulse which, together with the read-in signal from store 13, switches AND gate 4 to a logical 1 state. Comparators capable of comparing the contents of registers 11 and 12 are well-known in the art. The switching of AND gate 4 to a logical 1 state causes the Q output of a flip-flop 5 to switch from its normal logical 1 state to a logical 0 state and causes the $\overline{Q}$ output of flip-flop 5 to switch from its normal logical 0 state to a logical 1 state.

The Q output of flip-flop 5 is normally in a logical 1 state which enables an AND gate 3. However, when the Q outpt of flip-flop 5 is switched from its normal state to a logical 0 state in response to the pulse from AND gate 4 being applied to the set (S) input terminal of the flip-flop, a binary zero signal is produced at the Q output of the flip-flop which prevents AND gate 3 from transmitting the contents of buffer register 2 to execution register 8. As a result, instruction b cannot enter register 8 and cannot be executed. AND gate 4 and flip-flop 5 form a logic circuit for producing the logical 0 signal that disables AND gate 3.

When the $\overline{Q}$ output of flip-flop 5, which is normally in a logical 0 state, goes to a logical 1 state, an AND gate 6 is enabled. Terminal 6g of gate 6 receives a logical 1 state signal t from a source connected terminal 10, indicating that instruction a has been carried out at the end of time period t4. When the inputs to AND gate 6 are both switched to a logical 1 state, the output of gate 6 (at terminal 9) is switched to a logical 1 state. By using well-known apparatus, the logical 1 state of terminal 9 can be used to cause memory 1 to read out the instruction b' now stored at address B into register 2 and subsequently to register 8. The system then carries out instruction b' which is situated at address B, rather than the instruction b which was situated in the buffer register 2.

Flip-flop 5 is reset to its normal state each time execution register 8 is loaded The program then continues to be carried out in the normal way. That is, the contents of register 2 are transferred to register 8, and the instruction in register 8 is executed after the next sequential instruction has been read out of memory 1 into register 2. The process continues in the same way until there is a fresh alteration in the program.

Those skilled in the art will recognize that the single embodiment described herein can be altered and modified without departing from the true spirit and scope of the invention as defined in the accompanying claims.

What is claimed is:

1. A method of operating a data processing system including a look-ahead feature for an addressable program memory that supplies during interval t2 at least a portion of an instruction word b at address B to a buffer, the buffer previously being supplied during the immediately preceding interval t1 by the memory with at least a portion of an address word a from memory address A, the instruction word a being coupled from the buffer to an execution register during interval t2, the operations normally continuing in sequence for successive time intervals, t1, t2, t3, etc., so that instruction word b is normally supplied to the execution register during interval t3, the improvement comprising: preventing word b loaded in the buffer from being coupled from the buffer to the execution register during interval t3 in response to the instruction word at address B being changed from b to b' during the portion of t2 subsequent to b being loaded into the buffer and wherein the change in the instruction is indicated by sensing that the addresses of the words being read in and read out of the memory are both B during interval t2.

2. The method of claim 1 wherein the instruction word b' is the next word, after word b, supplied from the memory to the buffer register.

3. The method of claim 2 wherein the instruction word b' is the next word, after word a, coupled from the buffer register to the execution register.

4. In a data processing system including an addressable program instruction memory, a buffer register connected to said addressable program instruction memory for storing at least a portion of an instruction read from one address of the program memory, an execution register for storing the contents of said buffer register, the improvement comprising means connected between an output of the buffer register and an input of the execution register for loading the contents of the buffer register into the execution register in response to an address of the instruction which has been read into the buffer register differing from the address of a next instruction which is to be written into the addressable program instruction memory and for preventing the contents of the buffer register from being loaded into the execution register in response to the address of the instruction which has been read into the buffer register being the same as the address of the next instruction which is to be written into the addressable program instruction memory.

5. The apparatus of claim 4 wherein the means for loading and preventing includes comparator means for inhibiting the loading of the contents of the buffer register into the execution register in response to the address of the instruction which has been loaded into the buffer register being the same as the address of the next instruction which is to be written into the addressable program instruction memory.

6. The apparatus of claim 5 wherein the comparator mans has a first input connected to be responsive to an output of a memory address register containing the memory address of the instruction which is to be written into the addressable program instruction memory, said comparator means having a second input connected to be responsive to the output of an address buffer containing the memory address of the instruction which was loaded into the buffer register.

7. The apparatus of claim 6 wherein the means for loading and preventing includes a gate connected between the buffer register output and the execution register input for selectively feeding the contents of the buffer register to the execution register, and a flip-flop circuit having an input connected to the comparator and output connected to the gate to inhibit the gate in response to the contents of the memory address register being the same as the contents of the address buffer.

8. The apparatus of claim 5 wherein the means for loading and preventing includes a gate connected between the buffer register output and the execution register input for selectively feeding the contents of the buffer register to the execution register, and a flip-flop circuit having an input connected to the comparator and an output connected to the gate to inhibit the gate in response to the contents of the memory address register being the same as the contents of the address buffer.

* * * * *